(12) United States Patent
Hata et al.

(10) Patent No.: US 12,627,578 B2
(45) Date of Patent: May 12, 2026

(54) COMMUNICATION CONTROL METHOD, USER EQUIPMENT, AND CORE NETWORK APPARATUS

(71) Applicant: KYOCERA Corporation, Kyoto (JP)

(72) Inventors: Mitsutaka Hata, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 335 days.

(21) Appl. No.: 18/430,815

(22) Filed: Feb. 2, 2024

(65) Prior Publication Data

US 2024/0171481 A1 May 23, 2024

Related U.S. Application Data

(63) Continuation of application No. PCT/JP2022/029638, filed on Aug. 2, 2022.

(30) Foreign Application Priority Data

Aug. 5, 2021 (JP) ................................. 2021-129308

(51) Int. Cl.
| | |
|---|---|
| *H04L 41/5051* | (2022.01) |
| *H04L 41/0686* | (2022.01) |
| *H04L 41/0695* | (2022.01) |
| *H04L 41/0816* | (2022.01) |
| *H04L 41/5009* | (2022.01) |

(Continued)

(52) U.S. Cl.
CPC ...... *H04L 41/5051* (2013.01); *H04L 41/0686* (2013.01); *H04L 41/0695* (2013.01); *H04L 41/0816* (2013.01); *H04L 41/5009* (2013.01);

*H04W 28/16* (2013.01); *H04W 28/18* (2013.01); *H04W 28/24* (2013.01); *H04W 48/18* (2013.01)

(58) Field of Classification Search
CPC ............. H04L 41/5051; H04L 41/0686; H04L 41/0695; H04L 41/0816; H04L 41/5009; H04W 28/16; H04W 28/18; H04W 28/24; H04W 48/18
See application file for complete search history.

(56) References Cited

U.S. PATENT DOCUMENTS

2016/0353465 A1* 12/2016 Vrzic ................... H04L 41/5054
2017/0367036 A1 12/2017 Chen et al.
(Continued)

FOREIGN PATENT DOCUMENTS

JP 2019-519993 A 7/2019

OTHER PUBLICATIONS

3rd Generation Partnership Project; Technical Specification Group Radio Access Network; NR; NR and NG-RAN Overall Description; Stage 2 (Release 16); 3GPP TS 38.300 V16.1.0; Mar. 2020; pp. 1-133.

*Primary Examiner* — Brian J. Gillis
*Assistant Examiner* — Chhian (Amy) Ling
(74) *Attorney, Agent, or Firm* — Studebaker Brackett PLLC

(57) ABSTRACT

According to an aspect, a communication control method includes deciding, at a user equipment, a communication condition to be satisfied by a network slice desired by the user equipment, and transmitting, at the user equipment, a creation request to a core network apparatus, the creation request being a message requesting to create the network slice and including information indicating the communication condition.

15 Claims, 16 Drawing Sheets

(51) Int. Cl.
   *H04W 28/16*        (2009.01)
   *H04W 28/18*        (2009.01)
   *H04W 28/24*        (2009.01)
   *H04W 48/18*        (2009.01)

(56)                    References Cited

U.S. PATENT DOCUMENTS

2018/0317133 A1*  11/2018  Sciancalepore ....... H04W 24/02
2022/0166849 A1*   5/2022  Sun ................... H04W 52/0212
2022/0369215 A1*  11/2022  Dees .................... H04W 76/14

* cited by examiner

UE100 AMF300

PDU SESSION ESTABLISHMENT REQUEST — Sb1

(PDU session ID)

PDU SESSION ESTABLISHMENT ACCEPT — Sb2

(S-NSSAI for PDU session)

UE100                                                                      AMF300

PDU SESSION MODIFICATION REQUEST                          Sc1

PDU SESSION MODIFICATION ACKNOWLEDGE                Sd2 gNB200

AMF300

AMF CONFIGURATION UPDATE (List of supported S-NSSAI(s))

Se1

AMF CONFIGURATION UPDATE ACKNOWLEDGE

Se2

COMMUNICATION CONTROL METHOD, USER EQUIPMENT, AND CORE NETWORK APPARATUS

RELATED APPLICATIONS

The present application is a continuation based on PCT Application No. PCT/JP2022/029638, filed on Aug. 2, 2022, which claims the benefit of Japanese Patent Application No. 2021-129308 filed on Aug. 5, 2021. The content of which is incorporated by reference herein in their entirety.

TECHNICAL FIELD

The present disclosure relates to a communication control method, a user equipment, and a core network apparatus that are used in a mobile communication system.

BACKGROUND OF INVENTION

In the specifications of the Third Generation Partnership Project (3GPP), which is a standardization project for mobile communication systems, Network Slicing has been defined (for example, see Non-Patent Document 1). The network slicing is a technique for virtually dividing a physical network constructed by a communication operator to creating a plurality of virtual networks (network slices). For example, in a communication operator, a network slice can be created for each service type such as enhanced Mobile Broad Band (eMBB), Ultra-Reliable and Low Latency Communications (URLLC), and massive Machine Type Communications (mMTC).

In the specifications of 3GPP, network slices created by a communication operator are preconfigured for a user equipment. The user equipment selects a desired network slice among the network slices and notifies a network of the selected network slice to use the network slice.

CITATION LIST

Non-Patent Literature

Non-Patent Document 1: 3GPP TS 38.300 V16.1.0

SUMMARY

According to a first aspect, a communication control method includes deciding, at a user equipment, a communication condition to be satisfied by a network slice desired by the user equipment; and transmitting, at the user equipment, a creation request to a core network apparatus, the creation request being a message requesting to create the network slice and including information indicating the communication condition.

According to a second aspect, a communication control method includes receiving, at a core network apparatus, a creation request from a user equipment, the creation request requesting to create a network slice desired by the user equipment, in which the creation request includes information indicating a communication condition decided by the user equipment and to be satisfied by the network slice.

According to a third aspect, a user equipment includes a processor that performs the communication control method according to the first aspect.

According to a fourth aspect, a core network apparatus includes a processor that performs the communication control method according to the second aspect.

DESCRIPTION OF EMBODIMENTS

However, the network slice created by the communication operator may not necessarily satisfy a communication condition desired by the user equipment.

Therefore, the present disclosure makes it possible to create a network slice that satisfies a communication condition desired by a user equipment.

A mobile communication system according to an embodiment is described with reference to the drawings. In the description of the drawings, the same or similar parts are denoted by the same or similar reference signs.

Figure 1:
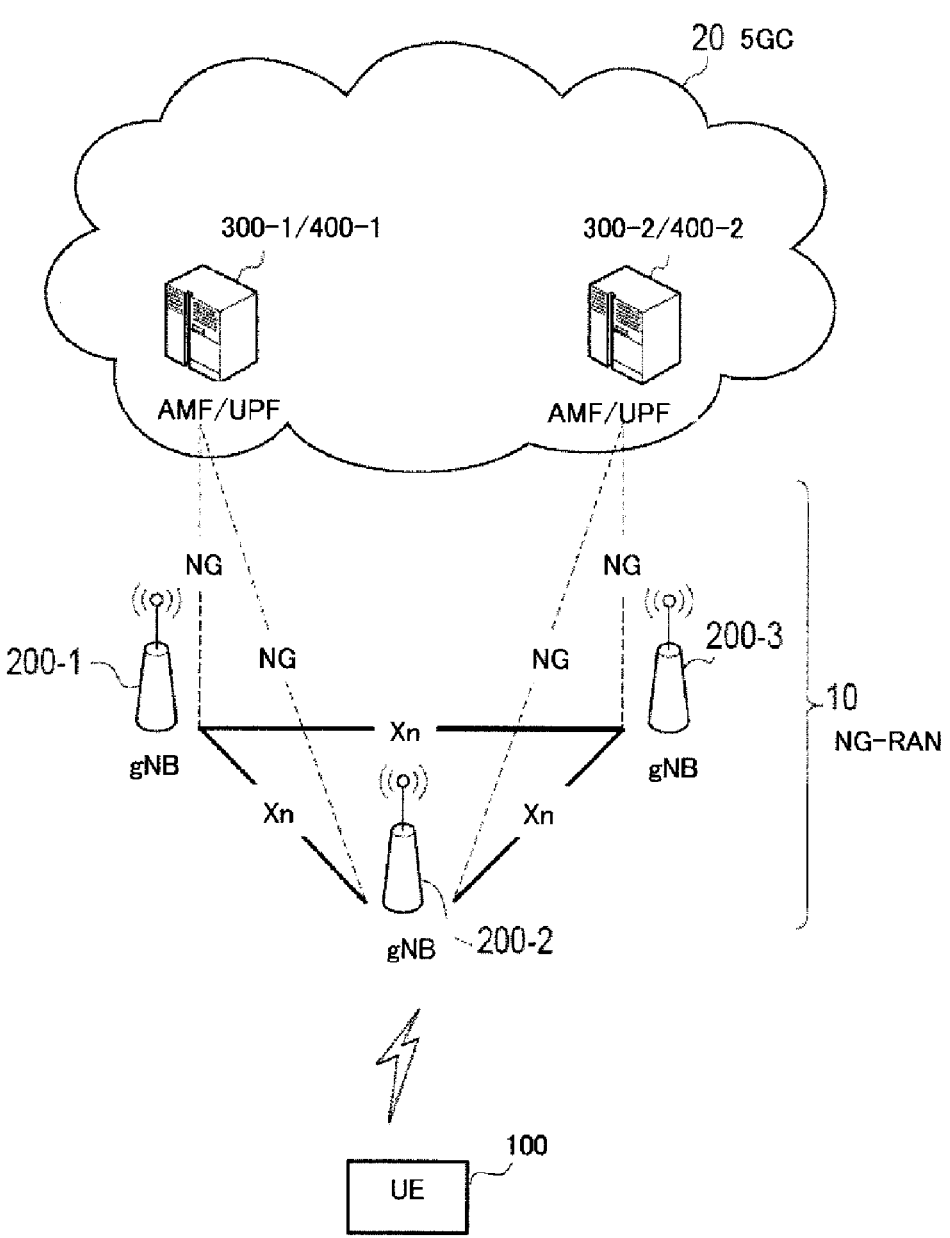
FIG. 1 is a diagram illustrating a configuration of a mobile communication system according to an embodiment.

Configuration of Mobile Communication System First, in an embodiment, a configuration of a mobile communication system is described with reference to FIGS. 1 to 6. FIG. 1 is a diagram illustrating a configuration of the mobile communication system according to an embodiment. The mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency. An XnAP (Application Protocol) message is transmitted and received between the gNBs 200 on the Xn interface.

Note that the gNB can be connected to an Evolved Packet Core (EPC) corresponding to a core network of LTE. An LTE base station (i.e., eNB) can be connected to the 5GC. The LTE base station and the gNB can be connected via an inter-base station interface. The LTE base stations connected to the 5GC 20 may be referred to as an ng-eNB. Hereinafter, the "gNB" may be interpreted as the "ng-eNB" or the "eNB".

The 5GC 20 includes an Access and Mobility Management Function (AMF) 300 and a User Plane Function (UPF) 400. The AMF 300 performs various types of mobility controls and the like for the UE 100. The AMF 300 manages mobility of the UE 100 by communicating with the UE 100 by using Non-Access Stratum (NAS) signaling. The UPF 400 controls data transfer. The AMF 300 and the UPF 400 are connected to the gNB 200 via an NG interface which is an interface between the base station and the core network. Specifically, the gNB 200 is interconnected to the AMF 300 via an NG-C interface and connected to the UPF 400 via an NG-U interface. An NGAP (Application Protocol) message is transmitted and received between the gNB 200 and the AMF 300 on the NG-C interface.

Figure 2:
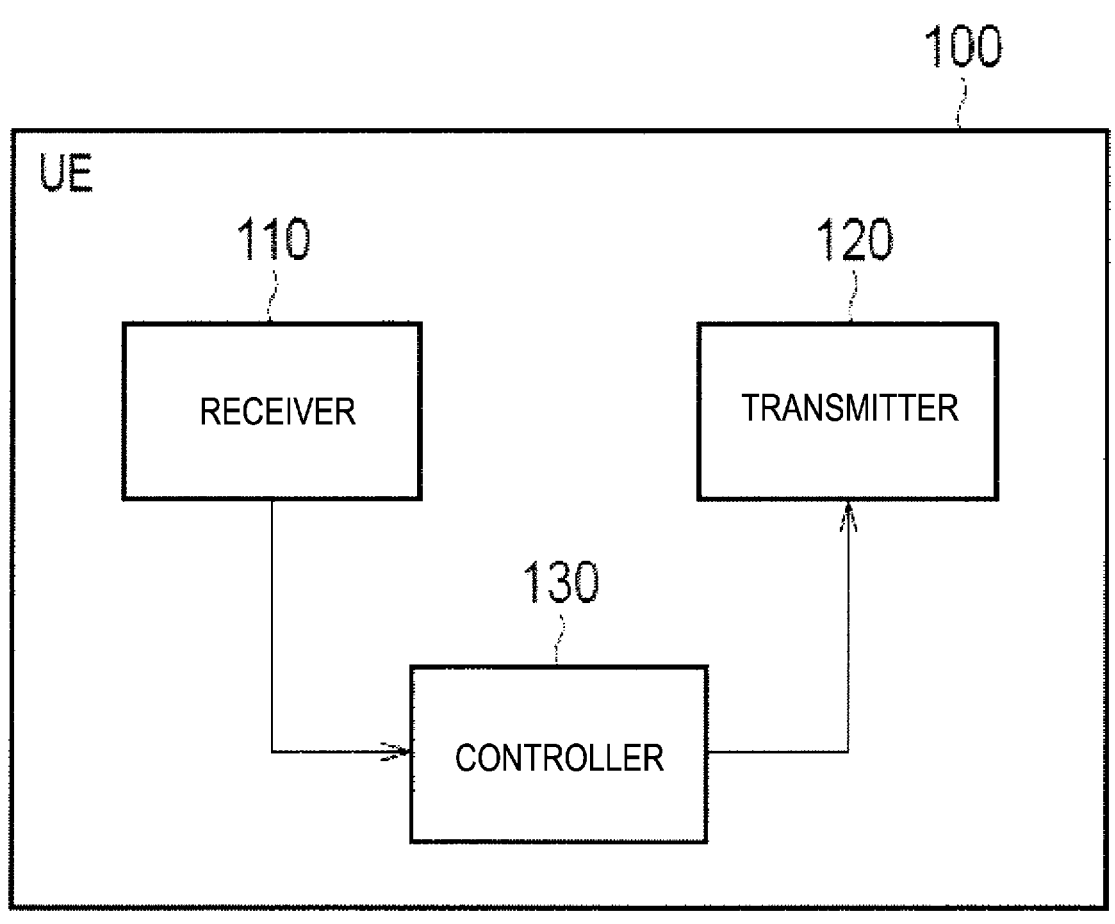
FIG. 2 is a diagram illustrating a configuration of a user equipment (UE) according to an embodiment.

FIG. 2 is a diagram illustrating a configuration of the user equipment (UE) 100 according to an embodiment. The UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processing includes processing of each layer described later. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
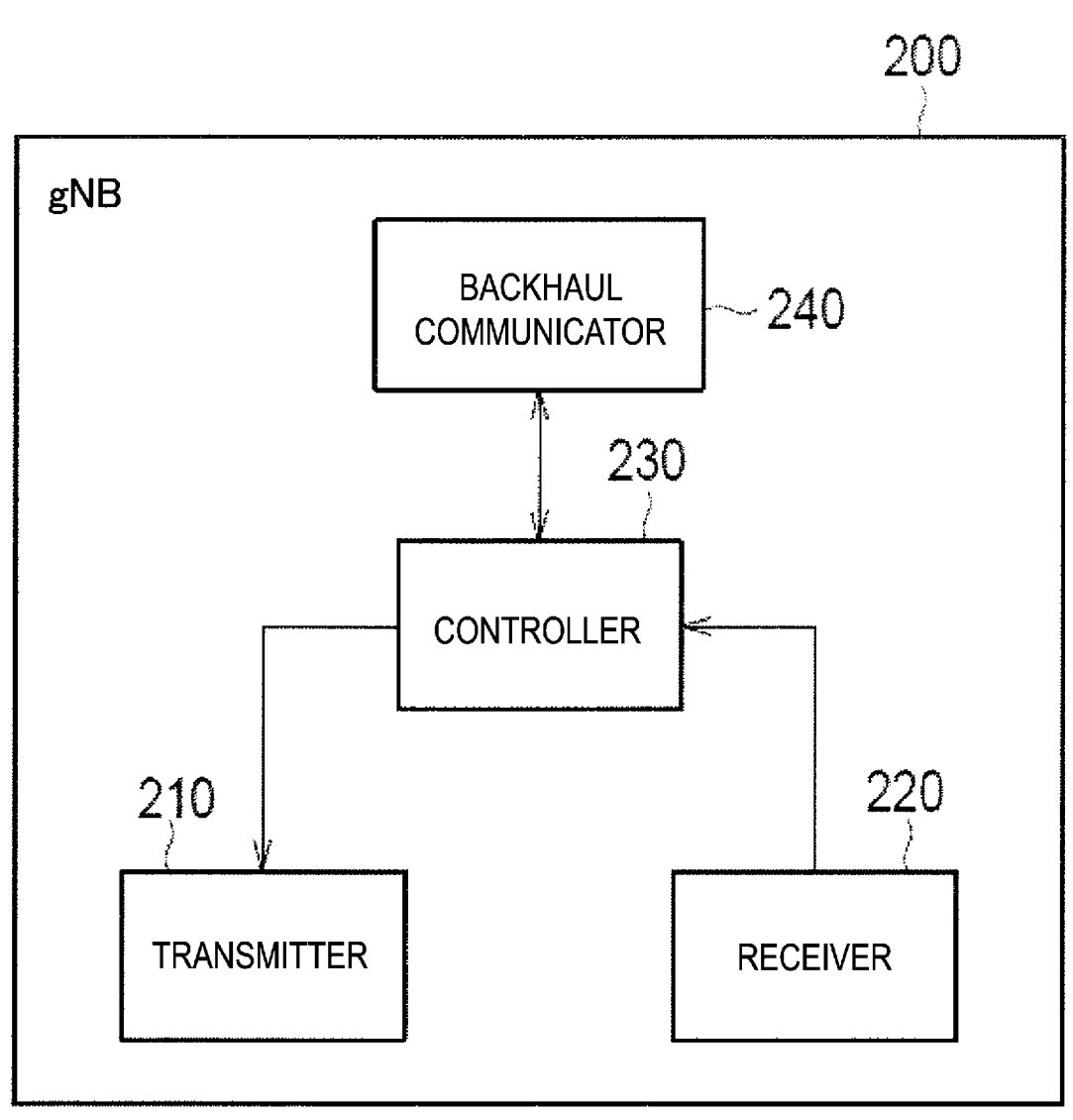
FIG. 3 is a diagram illustrating a configuration of a base station (gNB) according to an embodiment.

FIG. 3 is a diagram illustrating a configuration of the base station (gNB) 200 according to an embodiment. The gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processing in the gNB 200. Such processing includes processing of each layer described later. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF 300/UPF 400 via the interface between the base station and the core network. Note that the gNB may include a Central Unit (CU) and a Distributed Unit (DU) (i.e., functions are divided), and both units may be connected via an F1 interface.

Figure 4:
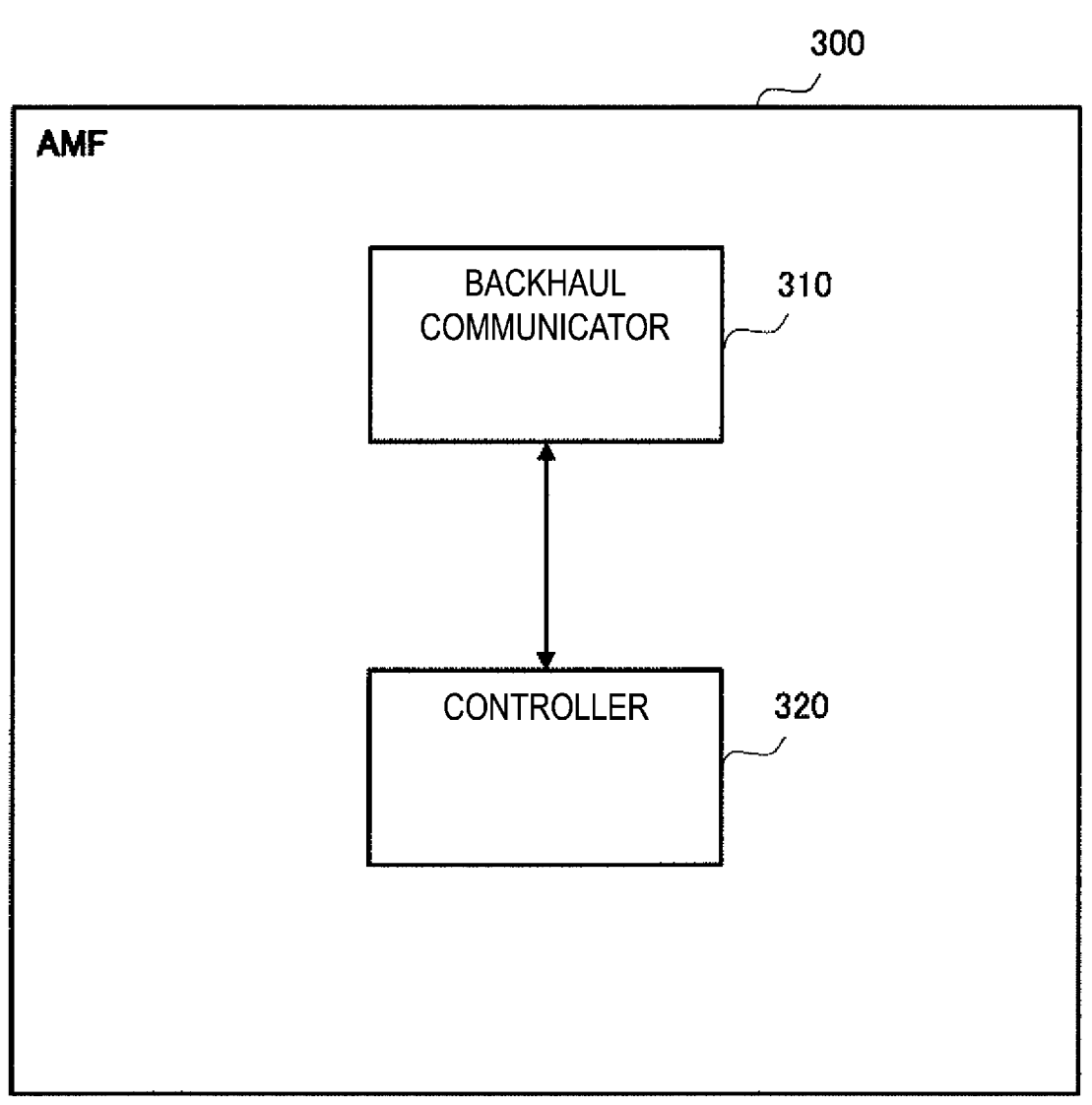
FIG. 4 is a diagram illustrating a configuration of a core network apparatus (AMF) according to an embodiment.

FIG. 4 is a diagram illustrating a configuration of the AMF 300 (core network apparatus) according to an embodiment. The AMF 300 includes a backhaul communicator 310 and a controller 320. Note that an example of the core network apparatus is the AMF 300, but the core network apparatus may be the UPF 400.

The backhaul communicator 310 is connected to the base station via the interface between the base station and the core network.

The controller 320 performs various types of control and processing in the AMF 300. Such processing includes processing of each layer described later. The AMF 300 includes at least one processor and at least one memory. The memory stores a program to be executed by the processor and information to be used for processing by the processor. The processor may include a CPU. The CPU executes the program stored in the memory to thereby perform various types of processing.

Figure 5:
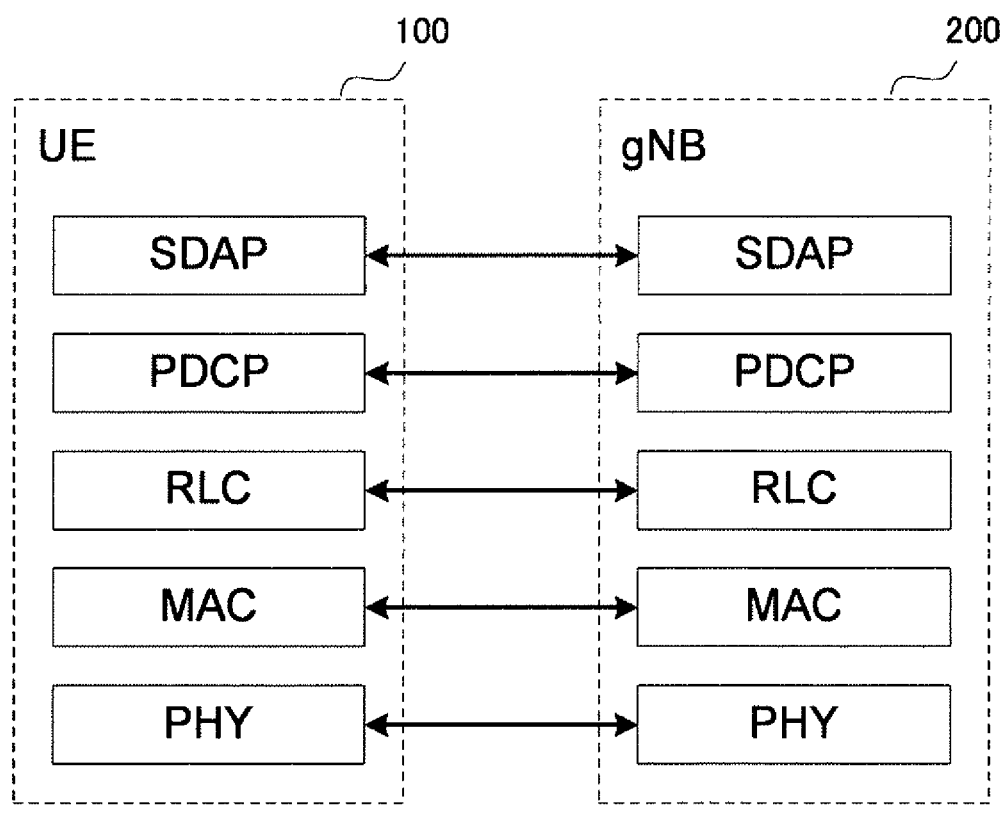
FIG. 5 is a diagram illustrating a configuration of a protocol stack of a radio interface of a user plane handling data.

FIG. 5 is a diagram illustrating a configuration of a protocol stack of a radio interface of a user plane handling data.

The radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 6:
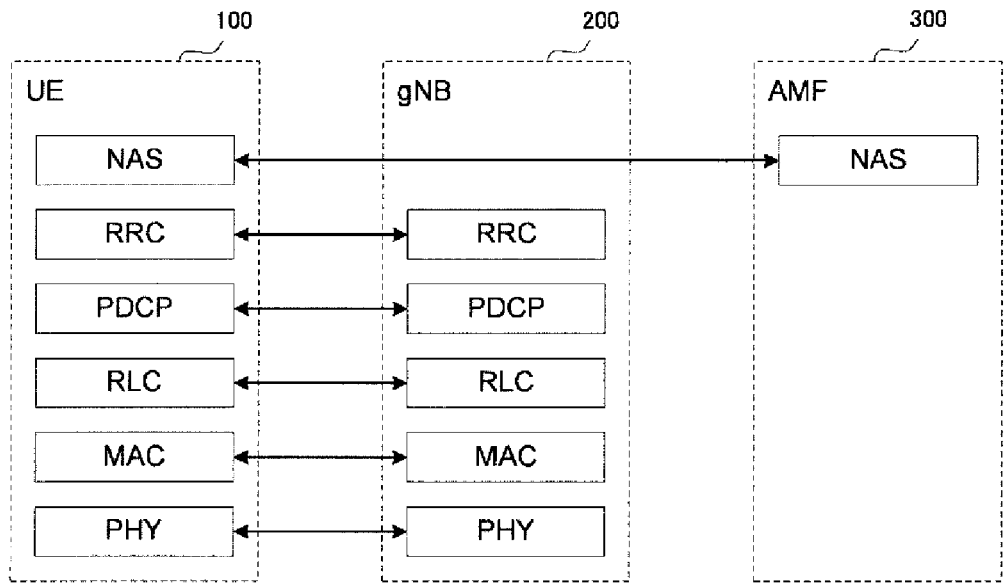
FIG. 6 is a diagram illustrating a configuration of a protocol stack of a radio interface of a control plane handling signaling (control signal).

FIG. 6 is a diagram illustrating a configuration of a protocol stack of a radio interface of a control plane handling signaling (a control signal).

The protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signaling (NAS message) is transmitted between the NAS layer of the UE 100 and the NAS layer of the AMF 300. The NAS message related to the session management may be transferred to a Session Management Function (SMF) via AMF 300. In other words, the UE 100 and the SMF transmit and receive a NAS message related to the session management via the AMF 300. The SMF is a core network apparatus that performs the session management and is connected to the AMF 300.

Note that the UE 100 includes an application layer other than the protocol of the radio interface.

Overview of Network Slicing

An overview of the network slicing is described. The network slicing introduces a technique for virtually dividing a physical network (e.g., a network including the NG-RAN 10 and the 5GC 20) constructed by an operator to create a plurality of virtual networks. Each virtual network is referred to as a network slice. Hereinafter, a "network slice" may be simply referred to as a "slice".

The network slicing enables a communication operator to create virtual network slices according to service requirements of different service types, such as eMBB, Ultra-Reliable and Low Latency Communications (URLLC), and massive Machine Type Communications (mMTC), so as to optimize network resources.

The slice is defined in a Public Land Mobile Network (PLMN). One slice includes a RAN part and a core network (CN) part. One slice is associated with one PDU session.

Figure 7:
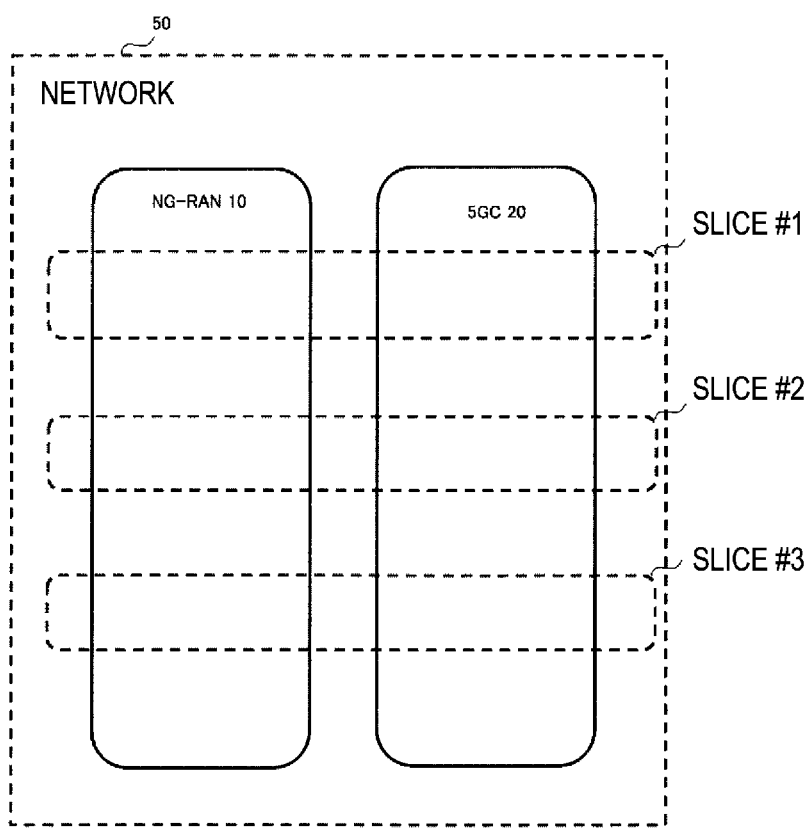
FIG. 7 is a diagram illustrating network slicing according to an embodiment.

FIG. 7 is a diagram illustrating network slicing according to an embodiment. As illustrated in the figure, three slices (slice #1 to slice #3) are created on a network 50 including the NG-RAN 10 and the 5GC 20. The slice #1 is associated with a service type of eMBB, the slice #2 is associated with a service type of URLLC, and the slice #3 is associated with a service type of mMTC. Note that three or more slices may be created on the network 50. One service type may be associated with a plurality slices.

Each slice is provided with a slice identifier for identifying the slice. Examples of the slice identifier include a Single Network Slicing Selection Assistance Information (S-NS-SAI). The S-NSSAI includes an 8-bit slice/service type (SST). The S-NSSAI may further include a 24-bit slice differentiator (SD). The SST is information indicating a service type with which a slice is associated. The SD is information for differentiating a plurality of slices associated with the same service type. The information including a plurality of pieces of S-NSSAI is referred to as a Network Slice Selection Assistance Information (NSSAI).

A plurality of slices may be grouped to create a slice group. Each slice group may be provided with a slice group identifier for identifying the slice group. Note that the slice group is different from the NSSAI. The slice group identifier does not include the slice identifier of each slice belonging to the slice group.

Each gNB 200 belonging to the NG-RAN 10 can support a plurality of slices. The gNB 200 may notify the UE 100 of the slice identifier of each slice supported by the gNB 200 in a broadcast RRC message (e.g., System Information Block (SIB) 1) or an individual RRC message (e.g., RRCRelease message). The gNB 200 may notify the AMF 300 of the slice identifier of each slice supported by the gNB 200 in an NGAP message. The gNB 200 may notify a neighboring gNB 200 of the slice identifier of each slice supported by the gNB 200 in an XnAP message.

Each gNB 200 can support a plurality of slice groups. The gNB 200 may notify the UE 100 of the slice group identifier of each slice group supported by the gNB 200 through a broadcast RRC message (e.g., SIB1) or an individual RRC message (e.g., RRCRelease message). The gNB 200 may notify the AMF 300 of the slice group identifier of each slice group supported by the gNB 200 in an NGAP message. The gNB 200 may notify the neighboring gNB 200 of the slice group identifier of each slice group supported by the gNB 200 in an XnAP message.

Each AMF 300 belonging to the 5GC 20 may support a plurality of slices. The AMF 300 may inform the gNB 200 of the slice identifier of each slice supported by the AMF 300 in an NGAP message.

Each AMF 300 may support a plurality of slice groups. The AMF 300 may notify the gNB 200 of the slice group identifier of each slice group supported by the AMF 300 in an NGAP message.

A NAS procedure for communication using a slice is described.

(1) Registration Procedure

Figure 8:
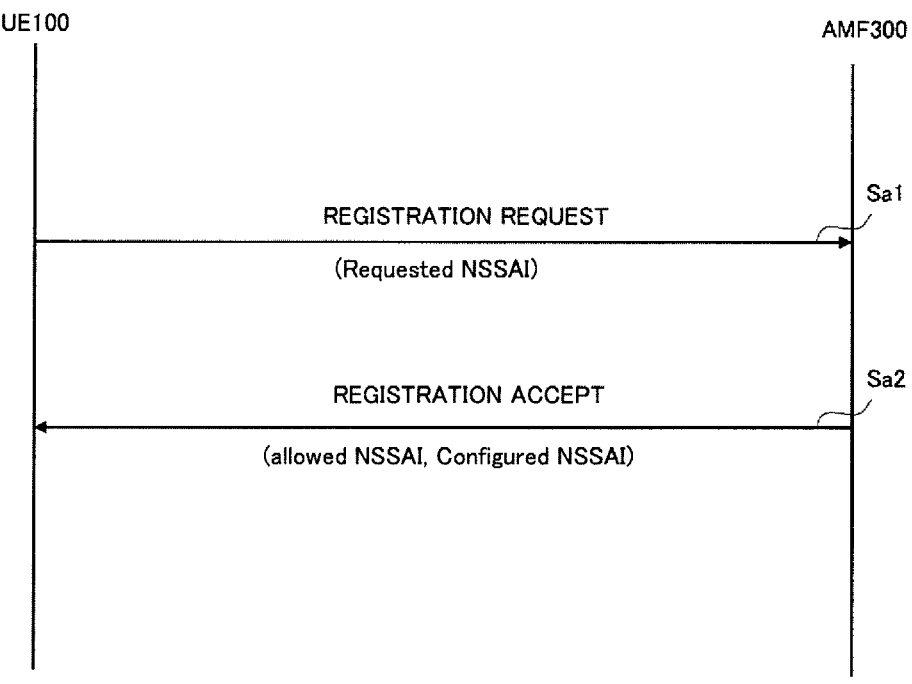
FIG. 8 is a diagram illustrating a Registration procedure according to an embodiment.

A Registration procedure is a procedure for the UE 100 to perform initial registration with the network 50. For example, a Tracking Area (TA) and a Registration Area (RA) are configured for the UE 100 from the AMF 300 in this procedure. FIG. 8 is a diagram illustrating the Registration procedure.

As illustrated in FIG. 8, in step Sa1, the UE 100 transmits a NAS message called a REGISTRATION REQUEST message to the AMF 300. In step Sa2, the AMF 300 transmits a NAS message called a REGISTRATION ACCEPT message to the UE 100. Here, the REGISTRATION REQUEST message may include an information element (IE) "Requested NSSAI". The "Requested NSSAI" is NSSAI (i.e., one or more slices) that the UE 100 wishes to register. The REGISTRATION ACCEPT message may include an IE "allowed NSSAI" and an IE "Configured NSSAI". The "Configured NSSAI" is NSSAI configured for the UE 100 by each PLMN. Note that the "allowed NSSAI" and the "Configured NSSAI" can be updated by a NAS message called a CONFIGURATION UPDATE COMMAND message transmitted from the AMF 300 to the UE 100.

(2) PDU Session Establishment Procedure

Figure 9:
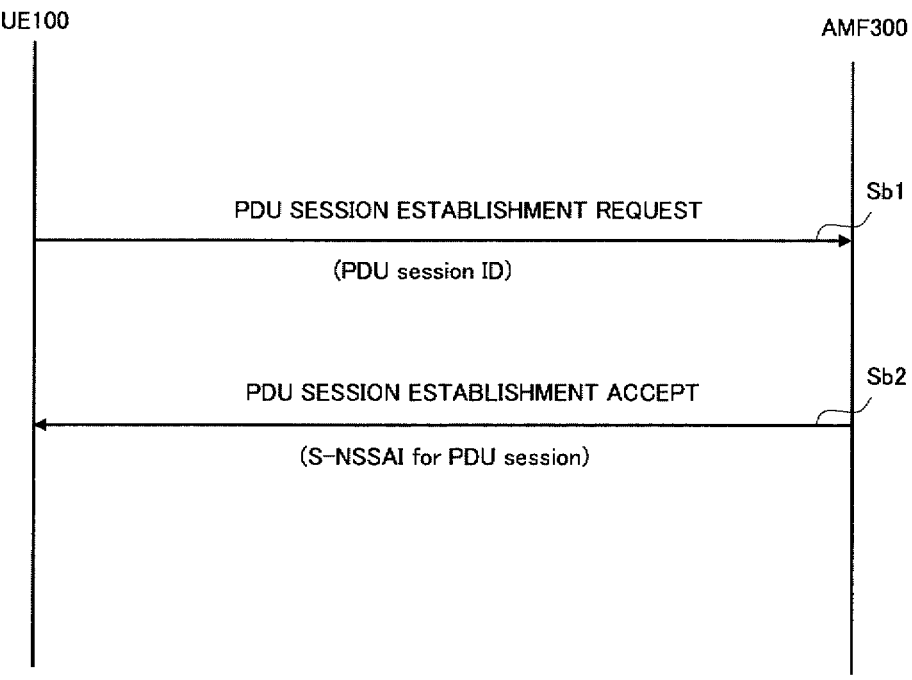
FIG. 9 is a diagram illustrating a PDU session establishment procedure according to an embodiment.

A PDU session establishment procedure is a procedure for establishing a PDU session. FIG. 9 is a diagram illustrating the PDU session establishment procedure. As illustrated in FIG. 9, in step Sb1, the UE 100 transmits a NAS message called a PDU SESSION ESTABLISHMENT REQUEST to the AMF 300. In step Sb2, the AMF 300 transmits a NAS message called a PDU SESSION ESTABLISHMENT ACCEPT message to the UE 100. Here, the PDU SESSION ESTABLISHMENT REQUEST message includes an identifier of a PDU session that the UE 100 wishes to establish. The PDU SESSION ESTABLISHMENT REQUEST message may include a slice identifier of a slice requested by the UE 100. The PDU SESSION ESTABLISHMENT ACCEPT message may include a slice associated with the UE 100 requested PDU session (the AMF 300 determined slice).

(3) PDU Session Modification Procedure

Figure 10:
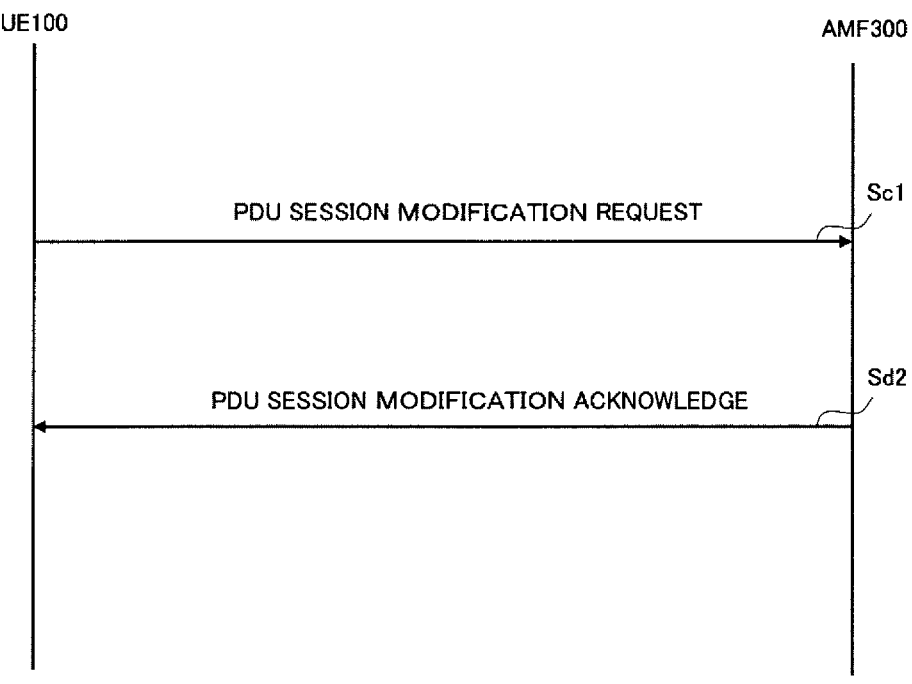
FIG. 10 is a diagram illustrating a PDU session modification procedure according to an embodiment.

A PDU session modification procedure is a procedure for enabling a configuration modification of an already established PDU session. FIG. 10 is a diagram illustrating the PDU session modification procedure. As illustrated in FIG. 10, in step Sc1, the UE 100 transmits a NAS message called a PDU SESSION MODIFICATION REQUEST to the AMF 300. In step Sb2, the AMF 300 transmits a NAS message called a PDU SESSION MODIFICATION ACKNOWL-EDGE message to the UE 100. Here, the PDU SESSION MODIFICATION REQUEST message includes an identifier of the PDU session configuration data updated by the UE 100. The PDU SESSION MODIFICATION ACKNOWL-EDGE message is a message to acknowledge that the configuration data has been successfully updated.

NGAP Procedure for Communication Utilizing Slice

An NGAP procedure for communication utilizing a slice is described.

(1) RAN Configuration Update Procedure

A RAN Configuration Update procedure is a procedure for updating the application level configuration data by the gNB 200.

Figure 11:
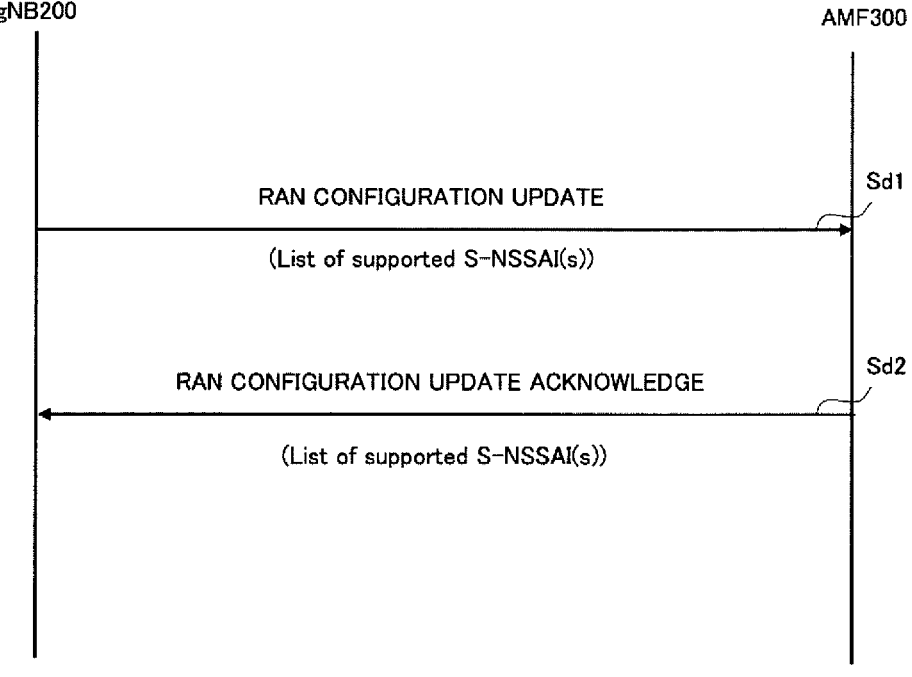
FIG. 11 is a diagram illustrating a RAN Configuration Update procedure according to an embodiment.

FIG. 11 is a diagram illustrating the RAN Configuration Update procedure. As illustrated in FIG. 11, in step Sd1, the gNB 200 transmits to the AMF 300 an NGAP message called a RAN CONFIGURATION UPDATE message including the application level configuration data updated by the gNB 200. In step Sd2, the AMF 300 transmits to the gNB 200 an NGAP message called a RAN CONFIGURATION UPDATE ACKNOWLEDGE message to acknowledge that the configuration data has been successfully updated. Here, the RAN CONFIGURATION UPDATE message may include a list of slices supported by the gNB 200 (List of supported S-NSSAI(s)).

Note that when the AMF 300 fails to update the configuration data, the AMF 300 transmits a RAN CONFIGURA-TION FAILURE message indicating the failure to the gNB 200.

(2) AMF Configuration Update Procedure

An AMF Configuration Update procedure is a procedure for updating the application level configuration data by the AMF 300.

Figure 12:
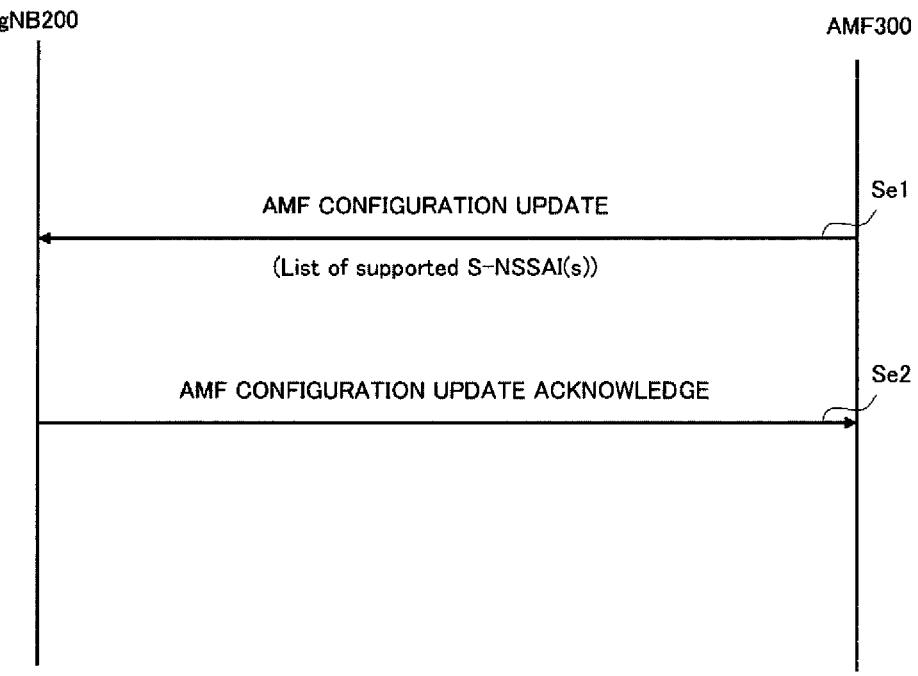
FIG. 12 is a diagram illustrating an AMF Configuration Update procedure according to an embodiment.

FIG. 12 is a diagram illustrating the AMF Configuration Update procedure. As illustrated in FIG. 12, in step Se1, the AMF 300 transmits to the gNB 200 an NGAP message called an AMF CONFIGURATION UPDATE message including the application level configuration data updated by the AMF 300. In step Se2, the gNB 200 transmits to the AMF 300 an NGAP message called an AMF CONFIGU-RATION UPDATE ACKNOWLEDGE message to acknowledge that the configuration data has been success-fully updated. Here, the AMF CONFIGURATION UPDATE message may include a list of slices supported by the AMF 300 (List of supported S-NSSAI(s)).

Note that when the gNB 200 fails to update the configuration data, the gNB 200 transmits an AMF CONFIGURA-TION FAILURE message indicating the failure to the AMF 300.

(Basic Operation)

In an embodiment, a basic operation is described.

In the technical specifications of 3GPP, network slices created by a communication operator are preconfigured for the UE 100. The UE 100 selects a network slice the UE 100 desires among the network slices and notifies a network of the selected network slice to use the network slice.

For example, the network slices created by the commu-nication operator are stored in a subscriber identity module (SIM) of the UE 100, and the UE 100 selects a network slice the UE 100 desires from the network slices. Then, the UE 100 notifies the AMF 300 of a REGISTRATION REQUEST message including "Requested NSSAI" including a slice identifier of the selected slice. Thereafter, the UE 100 receives a REGISTRATION ACCEPT message including "Allowed NSSAI" including the slice identifier to be enabled to use the slice.

However, the network slice created by the communication operator may not necessarily satisfy a communication con-dition desired by the UE 100. In this case, communication using a slice appropriate for the UE 100 cannot be per-formed.

In the embodiment, the UE 100 decides a communication condition to be satisfied by the network slice desired by the UE 100. The UE 100 transmits, to the AMF 300, a creation request that is a message requesting to create the network slice and includes information indicating the communication condition. By doing so, the network can grasp the commu-nication condition to be satisfied by the network slice desired by the UE 100 and can create a slice appropriate for the UE 100. Thus, the UE 100 can perform communication using the slice appropriate for the UE 100.

Figure 13:
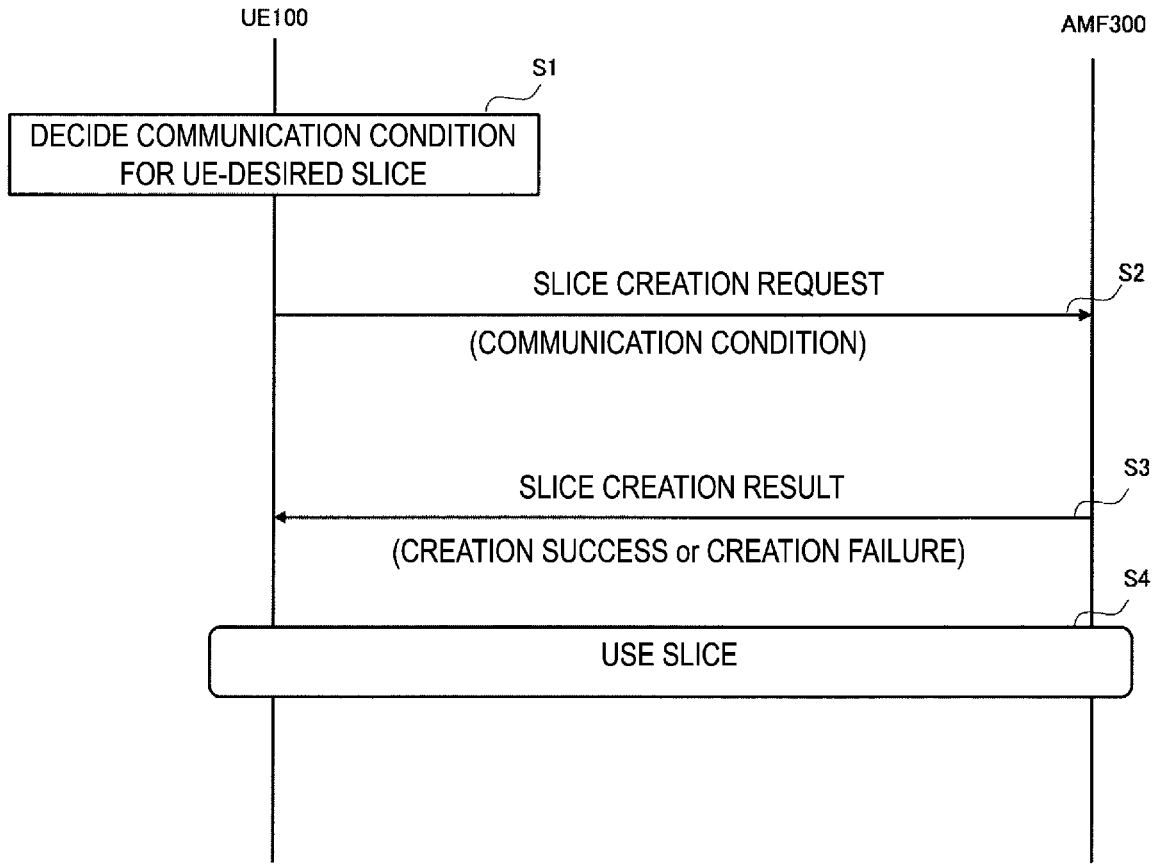
FIG. 13 is a diagram illustrating a basic operation according to an embodiment.

FIG. 13 is a diagram illustrating the basic operation according to the embodiment. As illustrated in FIG. 13, in step S1, the UE 100 decides a communication condition to be satisfied by the network slice desired by the UE 100. The communication condition includes at least one selected from the group consisting of (1) a requested service quality, (2) a requested communication path, (3) a requested DN, (4) a requested security, (5) a requested connection destination, (6) a requested communication operator, (7) a requested application, (8) a requested use schedule, and (9) a requested authentication method. Note that hereinafter, a "network slice desired by the UE 100" may be simply referred to as a "UE-desired slice". The communication request may be a slice designated by the UE 100. For example, a user of the UE 100 acquires a slice dedicated to an organization (company or the like) to which the user belongs from the organization and decides a communication request as a slice identifier of the slice.

Each of the communication conditions is described in detail.

(1) Requested Service Quality

The requested service quality indicates a service quality to be satisfied by the UE-desired slice. The requested service quality includes a Quality of Service (QoS) parameter. The QoS parameter may include an 5QI (5G QoS identifier), an ARP (allocation and retention priority), a GFBR (guaranteed flow bit rate), and an MFBR (maximum flow bit rate). Note that when the UE 100 is connected to the 5GC via an LTE base station, the QoS parameter may include a QoS class identifier (QCI), an ARP, an MBR (maximum bit rate), and a guaranteed bit rate (GBR). Note that for specific parameters included in the QoS parameter, refer to the existing 3GPP technical specifications. This is not limited in the present disclosure.

(2) Requested Communication Path

The requested communication path indicates a communication path for user data in the UE-desired slice. Such a communication path is a path including network nodes to be passed through by the user data of the UE 100 carried on the UE-desired slice to the DN. Such a network node is a UPF 400, for example. The requested communication path includes identifiers of a plurality of UPFs 400, for example.

(3) Requested DN

The requested DN indicates a DN to be connected with the UE-desired slice.

(4) Requested Security

The requested security indicates a security function supported by the UE 100 on the UE-desired slice. The security function includes, for example, an encryption algorithm and a protocol (e.g., IPsec VPN).

(5) Requested Connection Destination

The requested connection destination indicates a connection destination (for example, an IP address) to which the UE 100 connects via the UE-desired slice.

(6) Requested Operator

The requested operator indicates a communication operator capable of handling the UE-desired slice. For example, when the UE 100 wants to perform communication on the UE-desired slice even during roaming, the UE 100 requests the communication operator. The requested operator may be indicated by a PLMN (PLMN ID). The requested operator may be indicated by an operator code.

(7) Requested Application

The requested application indicates an application running on the UE-desired slice. The requested application may be previously authorized by the core network (e.g., AMF 300) to run on the UE-desired slice. The requested application may be indicated by an application identifier.

(8) Requested Use Schedule

The requested use schedule indicates a scheduled time for using the UE-desired slice. The scheduled time may be indicated by a frequency, a time of day, or a time slot. A timer for slice re-creation in the CN part or the RAN part, which will be described later, may be set according to the requested use schedule.

(9) Requested Authentication Method

The requested authentication method indicates an authentication method required to use the UE-desired slice. The authentication method includes information required for authentication (for example, an ID and a password), a qualification (for example, a membership qualification owned by the user of the UE 100), and a payment method (for example, a credit card number).

In step S2, the UE 100 transmits a slice creation request requesting to create a network slice to the AMF 300. The AMF 300 receives the slice creation request from the UE 100. The slice creation request includes information indicating a communication condition. The slice creation request may be transmitted in the NAS message such as the REGISTRATION REQUEST message and the PDU SESSION ESTABLISHMENT REQUEST message described above. The slice creation request may be transmitted in a new NAS message. Note that the UE 100 as a representative of a group including a plurality of UE 100 may transmit the slice creation request to the AMF 300.

In step S3, the AMF 300 transmits a slice creation result to the UE 100. The UE 100 receives the slice creation result from the AMF 300. The slice creation result is a slice creation success notification or a slice creation failure notification. The slice creation success notification includes a slice identifier for identifying a slice created based on the communication condition. The slice creation failure notification includes information indicating that the slice is failed to be created. A detailed operation related to the slice creation failure notification is described in Operation Example 3 described later.

The slice creation result may be transmitted in the above-described REGISTRATION ACCEPT message, PDU SESSION ESTABLISHMENT RESPONSE message, PDU SESSION MODIFICATION ACKNOWLEDGE message, or the like. The slice creation result may be transmitted in a new NAS message.

In the following description, assume that the slice creation result is a slice creation success notification.

In step S4, the UE 100 uses the slice (UE-desired slice) identified by the slice identifier received in step S3. Examples of using the slice are as follows.

First example: The UE 100 requests the UE-desired slice from the AMF 300 when performing initial registration with the network. To be specific, the UE 100 notifies the AMF 300 of the REGISTRATION REQUEST message including "Requested NSSAI" including the slice identifier received in step S3.

Second example: The UE 100 requests the AMF 300 to establish a PDU session on the UE-desired slice. To be specific, the UE 100 transmits the PDU SESSION ESTABLISHMENT REQUEST message including the slice identifier received in step S3 to the AMF 300.

Third example: The UE 100 changes the slice with which the already established PDU session can be associated to the UE-desired slice. To be specific, the UE 100 transmits the PDU SESSION ESTABLISHMENT modification request message including the slice identifier received in step S3 to the AMF 300. Note that the signaling for associating the already established PDU session with the UE-desired slice may be initiated by the gNB 200, the AMF 300, or the SMF.

In the basic operation, the communication condition may be decided by the application layer of the UE 100. The application layer provides the decided communication condition to the NAS layer of the UE 100, and the NAS layer transmits a slice creation request including the communication condition to the AMF 300. The application layer of the UE 100 may provide the communication condition to the AS layer of the UE 100. The communication condition may be notified from the application layer of the UE 100 to the AS layer via the NAS layer. The communication condition may be decided by the user of the UE 100.

Operation Example 1

Figure 14:
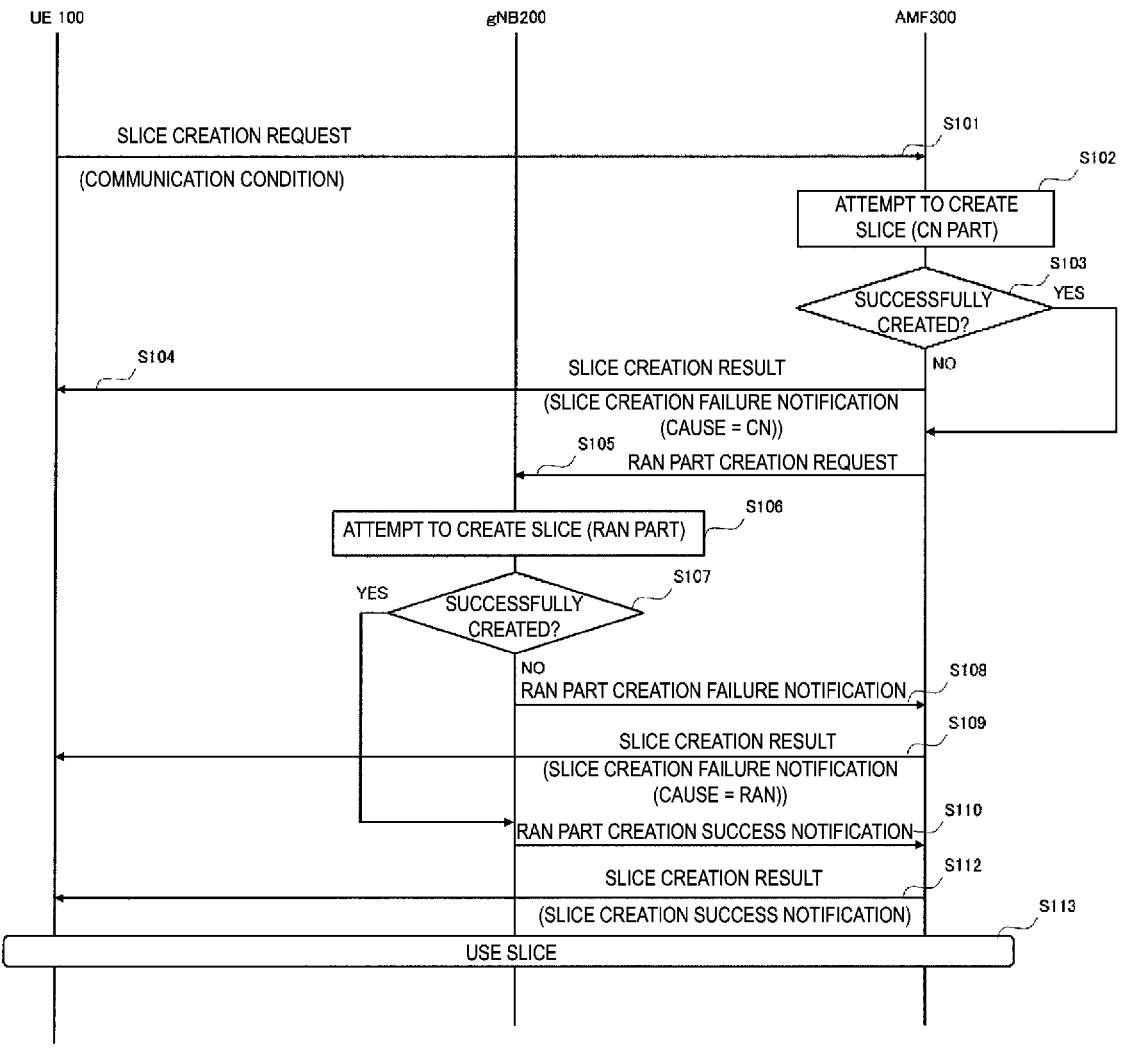
FIG. 14 is a diagram illustrating Operation Example 1 according to an embodiment.

In an embodiment, Operation Example 1 based on the basic operation is described. FIG. 14 is a diagram illustrating Operation Example 1.

As illustrated in FIG. 14, an operation of step S101 is the same as and/or similar to the operation of steps S1 in the basic operation.

In step S102, the AMF 300 attempts to create a CN part of the UE-desired slice. To be more specific, the AMF 300 extracts a communication condition to be satisfied by a CN part (hereinafter referred to as CN communication condition) from the communication conditions and attempts to create the CN part that satisfies the CN communication condition. Here, the CN communication condition include, for example, the above-described requested communication path, requested DN, requested security, requested connection destination, requested communication operator, and requested application.

The AMF 300 attempts to create the CN part in cooperation with other network nodes as needed. For example, when the CN communication condition includes the requested communication path, the AMF 300 attempts to create the CN part in cooperation with each network node (UPF 400) on the communication path.

In step S103, the AMF 300 determines whether the CN part is successfully created. Here, when the CN part satisfying at least one of the CN communication conditions can be created, the AMF 300 determines that the CN part is successfully created. Otherwise (or none of the CN communication conditions is satisfied), the AMF 300 determines that the CN part is failed to be created. Note that when a slice that satisfies the communication condition among the existing slices supported by the AMF 300 is present, the AMF 300 may extract the slice. In this case, the AMF 300 determines that the CN part is successfully created.

When the CN part is determined to be failed to be created (step S103: NO), in step S104, the AMF 300 transmits a slice creation failure notification as a slice creation result to the UE 100. The slice creation failure notification includes cause information indicating that a cause that the slice is failed to be created is due to the core network apparatus (AMF 300).

After transmitting the slice creation failure notification, the AMF 300 may set a flag indicating that the creation is failed in a storage area of the AMF 300. After setting such a flag, the AMF 300 may start a timer to prompt itself to create again. The slice creation failure notification may further include information indicating that the UE-desired slice can be created in the future. In this case, the slice creation failure notification may further include a scheduled time for creating the UE-desired slice. An operation of the UE 100 that receives the slice creation failure notification is described in Operation Example 3 described later.

On the other hand, when the CN part is determined to be successfully created (step S103: YES), in step S105, the AMF 300 transmits a RAN part creation request for requesting to create a RAN part of the UE-desired slice to the gNB 200. To be specific, first, the AMF 300 assigns a slice identifier to a slice including the CN part created by the AMF 300 and stores the slice identifier in the storage area of the AMF 300. Second, the AMF 300 extracts a communication condition to be satisfied by the RAN part (hereinafter referred to as RAN communication condition) from the communication conditions received in step S101. The RAN communication condition includes, for example, the requested service quality. Third, the AMF 300 transmits a RAN part creation request including the slice identifier and the RAN communication condition to the gNB 200. The RAN part creation request may be transmitted, for example, in the AMF CONFIGURATION UPDATE message described above. The RAN part creation request may be transmitted in a new NGAP message.

In step S106, the gNB 200 attempts to create a RAN part of the UE-desired slice. To be specific, the gNB 200 attempts to create the RAN part that satisfies the RAN communication condition received in step S105. For example, the gNB 200 attempts to secure radio resources (time/frequency resources that can be allocated to the UE 100) in such a manner that the RAN communication condition (requested service quality) is satisfied.

In step S107, the gNB 200 determines whether the RAN part is successfully created. Here, when the RAN part satisfying at least one of the RAN communication conditions can be created, the gNB 200 determines that the RAN part is successfully created. Otherwise, the gNB 200 determines that the RAN part is failed to be created.

Note that when a radio resource that satisfies the communication condition among the existing radio resources supported by the gNB 200 is present, the gNB 200 may allocate the radio resource. In this case, the gNB 200 determines that the RAN part is successfully created.

When the RAN part is determined to be failed to be created (step S107: NO), in step S108, the gNB 200 transmits a RAN part creation failure notification to the AMF 300. The AMF 300 receives the RAN part creation failure notification from the gNB 200. This allows the AMF 300 to grasp that the UE-desired slice requested by the UE 100 is failed to be created. Note that after determining that the RAN part is failed to be created, the gNB 200 may set a flag indicating that the creation is failed in a storage area of the gNB 200. After setting such a flag, the gNB 200 may start a timer to prompt itself to create again.

The RAN part creation failure notification includes cause information indicating a cause that the RAN part is failed to be created. Such a cause is due to, for example, being incapable of securing the radio resource. The RAN part creation failure notification may further include information indicating that the RAN part can be created when the resource situation is improved in the future. In this case, the RAN part creation failure notification may further include a scheduled time of creating the RAN part. The RAN part creation failure notification may be transmitted by, for example, in the AMF CONFIGURATION UPDATE FAILURE message described above. The RAN part creation failure notification may be transmitted in a new NGAP message.

In step S109, the AMF 300 transmits a slice creation failure notification as a slice creation result to the UE 100.

The slice creation failure notification includes the cause information indicating that a cause that the slice is failed to be created is due to the RAN (gNB 200).

On the other hand, when the RAN part is determined to be successfully created (step S107: YES), in step S110, the gNB 200 transmits a RAN part creation success notification to the AMF 300. The AMF 300 receives the RAN part creation success notification from the gNB 200. This allows the AMF 300 to grasp that the UE-desired slice requested by the UE 100 is successfully created.

The RAN part creation success notification may be transmitted in the AMF CONFIGURATION UPDATE ACKNOWLEDGE message described above. The RAN part creation success notification may be transmitted in a new NGAP message.

In step S112, the AMF 300 transmits the slice creation success notification as a slice creation result to the UE 100.

An operation of step S113 is the same as and/or similar to the operation of steps S4 in the basic operation.

Operation Example 2

Operation Example 2 is described. A description is given mainly on differences from the operation example described above.

Figure 15:
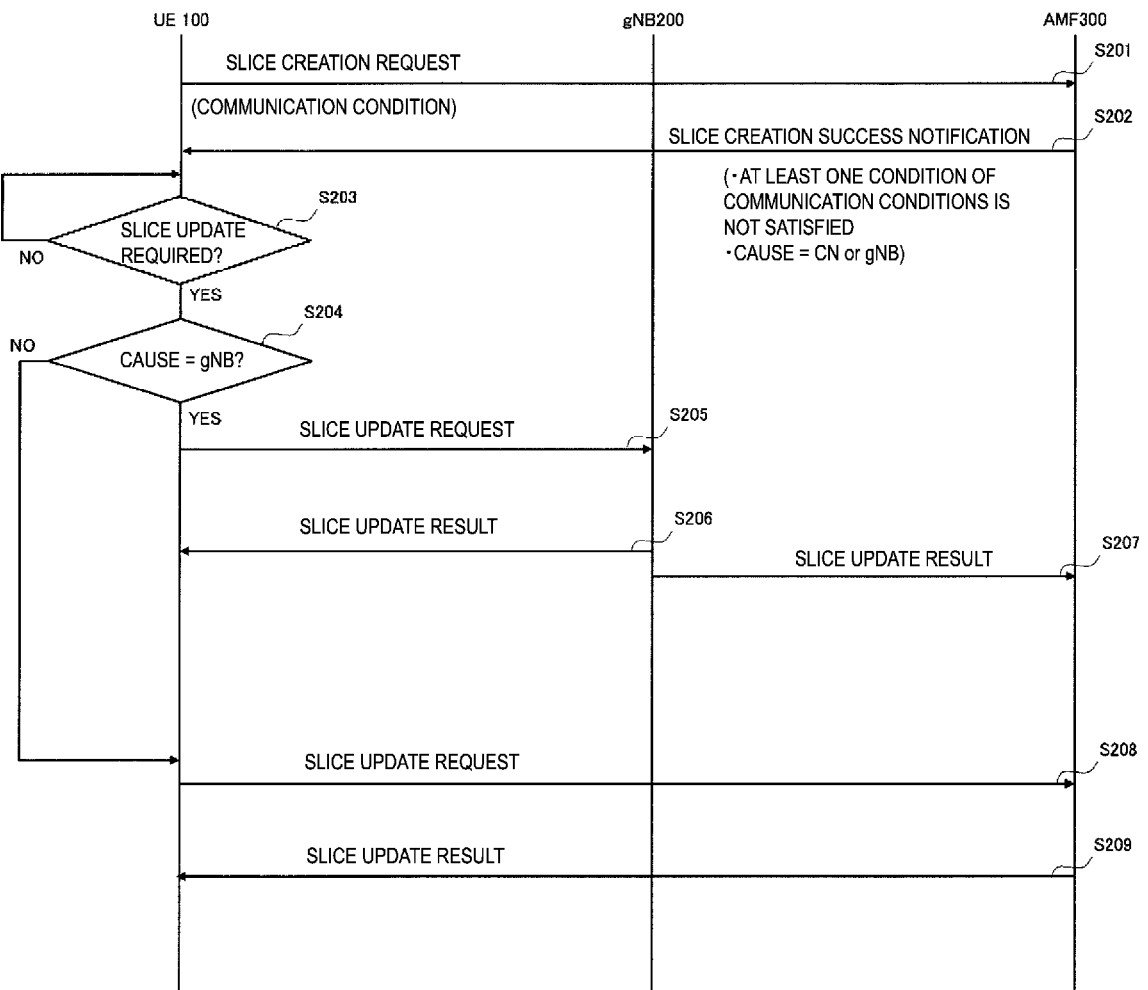
FIG. 15 is a diagram illustrating Operation Example 2 according to an embodiment.

Operation Example 2 is an operation example of a case in which a slice based on the communication condition is created but some of the communication conditions are not satisfied. FIG. 15 is a diagram illustrating Operation Example 2.

As illustrated in FIG. 15, an operation of step S201 is the same as and/or similar to the operation of steps S1 in the basic operation.

In step S202, the UE 100 receives the slice creation success notification from the AMF 300. The slice creation success notification includes a slice identifier for identifying the created slice, information indicating that at least one condition of the communication conditions for the slice is not satisfied, and cause information indicating a cause that the condition is not satisfied. The cause information indicates that the cause that the condition is not satisfied is due to the RAN (gNB 200) or indicates that the cause that the condition is not satisfied is due to the CN (AMF 300).

The slice creation success notification may further include a detailed condition for the unsatisfied communication condition. For example, when the requested service quality is not satisfied, the detailed condition indicates a service quality (QoS parameter) that the created slice satisfies. When the requested communication path is not satisfied, the detailed condition indicates a communication path on the created slice.

The UE 100 that receives such a slice creation success notification can grasp that the slice is created but some of the communication requests for the slice are not satisfied.

Note that the slice creation success notification received by the UE 100 from the AMF 300 may be provided from the NAS layer of the UE 100 to the AS layer of the UE 100. This allows the AS layer to grasp a state of the slice creation and request to update the slice described later.

In step S203, the UE 100 determines whether the slice is required to be updated. For example, the UE 100 may determine whether the update is required based on the detailed conditions received in step S202. When the UE 100 does not accept the conditions indicated by the detailed conditions, the UE 100 determines that the slice is required to be updated.

When the UE 100 determines that the slice is required to be updated (step S203: YES), the UE 100 transmits a slice update request for updating the slice to make the unsatisfied communication condition be satisfied. The UE 100 decides a transmission destination of the slice update request as the gNB 200 or the AMF 300 based on the cause information.

In step S204, the UE 100 determines whether the cause information indicates the gNB 200. When the cause information indicates the gNB 200 (step S204: YES), in step S205, the UE 100 transmits the slice update request to the gNB 200. This can reduce overhead as compared with the request via the AMF 300. The slice update request includes a slice identifier of the slice required to be updated and the communication condition requested by the UE 100 for the slice.

Note that contents of the slice update request may be decided by the application layer of the UE 100. The application layer transmits the decided contents to the AS layer of the UE 100. Then, the UE 100 (AS layer) transmits the slice update request to the gNB 200.

In step S206, the gNB 200 transmits a slice update result to the UE 100. The UE 100 receives the slice update result from the gNB 200. The slice update result includes update success information indicating that the slice is successfully updated or update failure information indicating that the slice is failed to be updated. The UE 100 that receives the slice update result including an update success information can use the updated slice. On the other hand, the UE 100 that receives the slice update result including the update failure information can request the gNB 200 to update the slice again.

Here, description is given of a message used when a slice update request is transmitted from the UE 100 to the gNB 200 and a message used when a slice update result is transmitted from the gNB 200 to the UE 100.

For the UE 100 in the RRC idle state or the RRC inactive state, the transmitting the slice update request and the slice update result may be performed by using a message in the random access procedure. By doing so, the UE 100 can receive the slice update result from the gNB 200 without transitioning to the RRC connected state and can reduce power consumption caused by transitioning to the RRC connected state.

For the UE 100 in the RRC idle state or the RRC inactive state, the message used for transmitting the slice update request may be Message 1 (MSG1) or Message 3 (MSG3) in 4-step random access procedure. The message used for transmitting the slice update request may be Message A (MSGA) in 2-step random access procedure. The message used for transmitting the slice update result may be Message 4 (MSG4) in the 4-step random access procedure. The message used for transmitting the slice update result may be Message B (MSGB) in the 2-step random access procedure. The MSGA is a message into which the MSG1 and the MSG3 are combined. The MSGB is a message into which the MSG2 and the MSG4 are combined.

The MSG1 is a random access preamble transmitted from the UE 100 to the gNB 200. The MSG2 is a response to the random access preamble and includes transmission resource information for the MSG3 scheduled by the gNB 200. The MSG3 is the first scheduled transmission in the random access procedure. The MSG3 is, for example, an RRCSetupRequest message for establishing an RRC connection, an RRCResumeRequest message for resuming an RRC connection, an RRCReestablishmentRequest message for re-establishing an RRC connection, or the like. The MSG3 may be a message dedicated to the slice update request. The MSG4 is a response to the MSG3, and is, for example, an RRCSetup message for establishing an RRC connection, an RRCResume message for resuming an RRC connection, an RRCReestablishment message for re-establishing an RRC connection, or the like. The MSG4 may be a message dedicated to the slice update result.

For the UE 100 in the RRC connected state, the transmitting the slice update request is performed using, for example, a UEAssistanceInformation message. The transmitting the slice update result is performed using, for example, an RRCReconfiguration message, an RRCRelease message or the like.

In step S207, the gNB 200 transmits the slice update result to the AMF 300. The slice update result may be transmitted in the RAN Configuration Update message. The slice update result may be transmitted in a new NGAP message.

A case in which the UE 100 transmits a slice update request to the AMF 300 is described.

When the cause information does not indicate the gNB 200 (i.e., the cause information indicates the AMF 300) (step S204: NO), in step S208, the UE 100 transmits the slice update request to the AMF 300. The slice update request includes a slice identifier of the slice required to be updated and the communication condition requested by the UE 100 for the slice. The slice update request may be transmitted in the above-described PDU SESSION ESTABLISHMENT REQUEST message or PDU SESSION MODIFICATION REQUEST message. The slice update request may be transmitted in a new NAS message.

In step S209, the AMF 300 transmits a slice update result to the UE 100. The UE 100 receives the slice update result from the AMF 300. The slice update result includes update success information indicating that the slice is successfully updated or update failure information indicating that the slice is failed to be updated. The UE 100 that receives the slice update result including an update success information can use the updated slice. On the other hand, the UE 100 that receives the slice update result including the update failure information can request the AMF 300 to update the slice again.

The slice update result may be transmitted in the NAS message such as the REGISTRATION ACCEPT, PDU SESSION ESTABLISHMENT RESPONSE, or PDU SESSION MODIFICATION ACKNOWLEDGE message described above. The slice update result may be transmitted in a new NAS message.

In Operation Example 2, the UE 100 may request the AMF 300 to update the RAN part of the UE-desired slice. That is, even when the cause information indicates the gNB 200, the UE 100 may transmit the slice update request to the AMF 300. In this case, the AMF 300 forwards the request to the gNB 200. This incurs overhead but may be more desirable for management/sequence reasons.

In Operation Example 2, the UE 100 may request the gNB 200 to update the CN part of the UE-desired slice. That is, even when the cause information indicates the AMF 300, the UE 100 may transmit the slice update request to the gNB 200. In this case, the gNB 200 forwards the request to the AMF 300. This incurs overhead but may be more desirable for management/sequence reasons.

Variation 1 of Operation Example 2

Variation 1 of Operation Example 2 is described. Compared with Operation Example 2, in Variation 1, the gNB 200 autonomously updates the slice without receiving the slice update request from the UE 100. For example, the gNB

200 transmits the slice update result to the UE 100 and the AMF 300 when a utilization situation of the radio resources is improved and the RAN part can be created that satisfies the requested service quality not satisfied at the time of the first creation. In this case, the slice update result may be transmitted in a RAN paging message.

The gNB 200 may transmit the slice update result with respect to a plurality of UE 100 using the same slice. In this case, the gNB 200 transmits the RAN paging message with the slice identifier of the updated slice being included in an information element (PagingRecord) indicating a paging target in the RAN paging message. The gNB 200 may transmit the slice update result in the SIB.

Variation 2 of Operation Example 2

Variation 2 of Operation Example 2 is described. Compared with Operation Example 2, in Variation 2, the AMF 300 autonomously updates the slice without receiving the slice update request from the UE 100. For example, the AMF 300 transmits the slice update result to the UE 100 and the gNB 200 when the slice can be created that satisfies the communication condition not satisfied at the time of the first creation. In this case, the slice update result may be transmitted in a CN paging message.

The AMF 300 may transmit the slice update result with respect to a plurality of UE 100 using the same slice. In this case, The AMF 300 transmits the CN paging message with the slice identifier of the updated slice being included in an information element (PagingRecord) indicating a paging target in the CN paging message.

Operation Example 3

Operation Example 3 is described. A description is given mainly on differences from the operation example described above.

Figure 16:
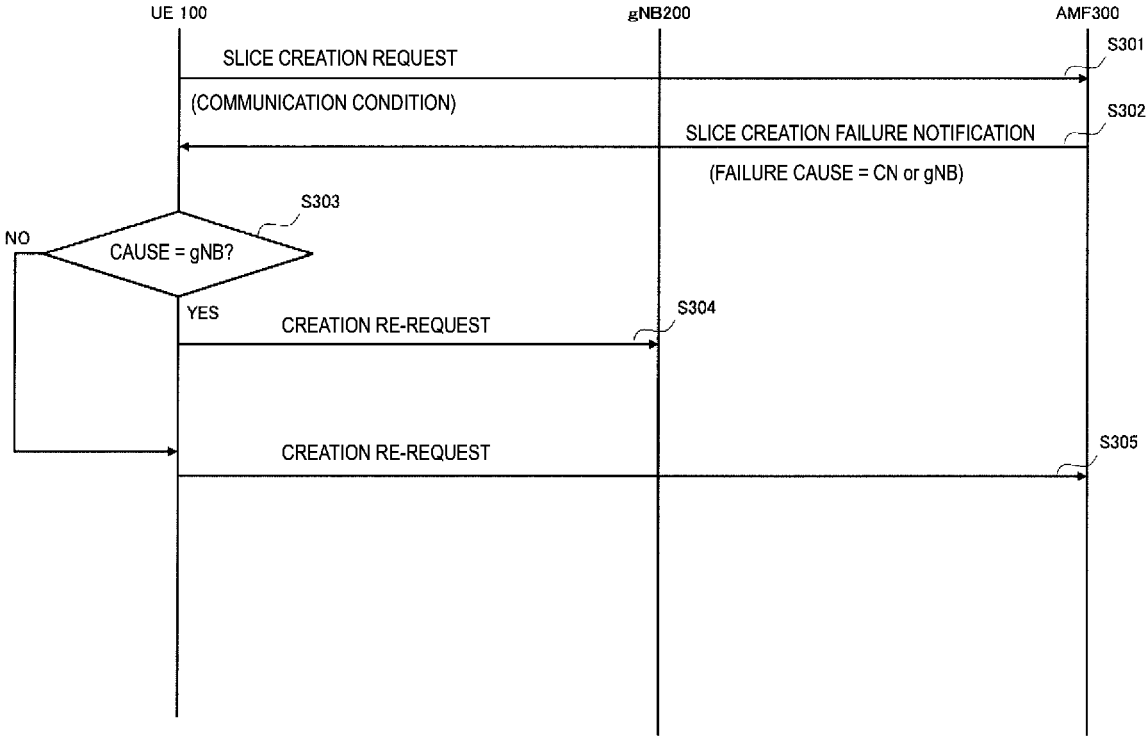
FIG. 16 is a diagram illustrating Operation Example 3 according to an embodiment.

Operation Example 3 is an operation example related to the operation of the UE 100 that receives the creation failure notification. FIG. 16 is a diagram illustrating Operation Example 3.

As illustrated in FIG. 16, an operation of step S301 is the same as and/or similar to the operation of steps S1 in the basic operation.

In step S302, the UE 100 receives a slice creation failure notification from the AMF 300. The slice creation failure notification includes cause information indicating a cause that the slice is failed to be created. The cause information indicates that the cause of failure is due to the RAN (gNB 200) or indicates that the cause of failure is due to the CN (AMF 300).

The UE 100 that receives the slice creation failure notification transmits a creation re-request re-requesting to create the slice. The UE 100 decides a transmission destination of the creation re-request as the gNB 200 or the AMF 300 based on the cause information.

Note that the slice creation failure notification received by the UE 100 from the AMF 300 may be provided from the NAS layer of the UE 100 to the AS layer of the UE 100. This allows the AS layer to grasp a state of the slice creation and request to re-create the slice described later.

In step S303, the UE 100 determines whether the cause information indicates the gNB 200. When the cause information indicates the gNB 200 (step S303: YES), in step S304, the UE 100 transmits the creation re-request to the gNB 200. This can reduce overhead as compared with the request via the AMF 300. The creation re-request includes the communication condition requested by the UE 100. The operation of the gNB 200 that receives the creation re-request is the same as and/or similar to the operations of the step S106 and subsequent steps in Operation Example 1.

When the cause information does not indicate the gNB 200 (i.e., the cause information indicates the AMF 300) (step S303: NO), in step S305, the UE 100 transmits the creation re-request to the AMF 300. The operation of the AMF 300 that receives the creation re-request is the same as and/or similar to the operations of the step S102 and subsequent steps in Operation Example 1.

In Operation Example 3, when the UE 100 receives the slice creation failure notification from the AMF 300, the NAS layer of the UE 100 may provide the slice creation failure notification to the AS layer of the UE 100. The NAS layer may provide tracking area (TA) information managed by the NAS layer to the AS layer. By doing so, the AS layer can make determination on cell selection for slice connection or the like.

Variation of Operation Example 3

Variation of Operation Example 3 is described.

In a variation of Operation Example 3, the slice creation failure notification further includes information indicating a network apparatus that supports an existing slice satisfying the communication condition. Such an existing slice is a slice that is not supported by the AMF 300 itself that receives the slice creation request. As a result, even when the AMF 300 fails to create the UE-desired slice, the AMF 300 can introduce a network apparatus supporting the existing slice satisfying the communication condition to the UE 100, and the UE 100 can access the network apparatus to use the UE-desired slice.

The network apparatus included in the slice creation failure notification is, for example, a gNB 200 that manages a cell other than the serving cell of the UE 100, and an AMF 300 that belongs to a PLMN other than the serving PLMN of the UE 100. The slice creation failure notification includes information indicating these cells and PLMNs. The UE 100 that receives the slice creation failure notification accesses the network apparatus to use the slice.

Other Embodiments

The user of the UE 100 may request the core network to create a UE-desired slice over the Internet. For example, the user accesses a website for slice creation in a browser and inputs a communication request. The website notifies the user of a slice identifier of the created slice. Then, the user stores the slice identifier in a storage area (e.g., SIM) of the UE 100. This allows the UE 100 to use the UE-desired slice.

The operation flows (operation examples) described above can be separately and independently implemented, and also be implemented in combination of two or more of the operation flows. For example, some steps of one operation flow may be added to another operation flow or some steps of one operation flow may be replaced with some steps of another operation flow.

In the embodiments and examples described above, an example in which the base station is an NR base station (gNB) is described; however, the base station may be an LTE base station (eNB) or a 6G base station. The base station may be a relay node such as an Integrated Access and Backhaul (IAB) node. The base station may be a Distributed Unit (DU) of the IAB node. The user equipment may be a Mobile Termination (MT) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing processing performed by the UE 100 or the gNB 200 may be integrated, and at least a part of the UE 100 or the gNB 200 may be implemented as a semiconductor integrated circuit (chipset, System on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a", "an", and "the" are added in the present disclosure through translation, these articles include the plural unless clearly indicated otherwise in context.

Embodiments have been described above in detail with reference to the drawings, but specific configurations are not limited to those described above, and various design variation can be made without departing from the gist of the present disclosure.

REFERENCE SIGNS

1: Mobile communication system
10: NG-RAN
20: 5GC
50: Network
100: UE
110: Receiver
120: Transmitter
130: Controller
200 (200-1 to 200-3): gNB
210: Transmitter
220: Receiver
230: Controller
240: Backhaul communicator
300: AMF
310: Backhaul communicator
320: Controller

The invention claimed is:

1. A communication control method comprising:

deciding, at a user equipment, a communication condition to be satisfied by a network slice desired by the user equipment;

transmitting, at the user equipment, a creation request to a core network apparatus, the creation request being a message requesting to create the network slice and comprising information indicating the communication condition;

receiving, at the user equipment, a creation success notification from the core network apparatus after transmitting the creation request, the creation success notification comprising a slice identifier configured to identify the network slice created based on the communication condition;

creating, at the core network apparatus and a base station, the network slice; and transmitting, at the user equipment when the creation success notification comprises information indicating that at least one condition of a plurality of the communication conditions for the network slice is not satisfied, an update request configured to update the network slice to the core network apparatus or the base station in such a manner that the at least one condition of the plurality of the communication conditions is satisfied.

2. The communication control method according to claim 1, wherein the communication condition comprises at least one selected from the group consisting of a requested service quality indicating a service quality to be satisfied by the network slice, a communication path of user data in the network slice, an application running on the network slice, a scheduled time for using the network slice, and an authentication method required for using the network slice.

3. The communication control method according to claim 1, further comprising using, at the user equipment, the network slice identified by the slice identifier.

4. The communication control method according to claim 1, wherein the creation success notification comprises cause information indicating whether a cause that the at least one condition of the plurality of the communication conditions is not satisfied is due to the core network apparatus or due to the base station, and wherein the transmitting the update request comprises transmitting, at the user equipment, the update request to the core network apparatus when the cause information indicates the core network apparatus, and transmitting, at the user equipment, the update request to the base station when the cause information indicates the base station.

5. The communication control method according to claim 1, further comprising receiving, at the user equipment, information indicating that the network slice is updated, from the base station or the core network apparatus.

6. The communication control method according to claim 1, further comprising receiving, at the user equipment, a creation failure notification from the core network apparatus after transmitting the creation request, the creation failure notification comprising information indicating that the network slice is failed to be created.

7. The communication control method according to claim 6, wherein the creation failure notification further comprises information indicating a network apparatus belonging to an existing network slice that satisfies the communication condition, and wherein the communication control method further comprises accessing, at the user equipment, the network apparatus.

8. The communication control method according to claim 6, wherein the creating the network slice is performed by the core network apparatus and the base station, and wherein the communication control method further comprises transmitting, at the user equipment, a creation re-request to the core network apparatus or the base station in response to the receiving the creation failure notification, the creation re-request re-requesting to create the network slice.

9. The communication control method according to claim 8, wherein the creation failure notification comprises cause information indicating whether a cause that the network slice is failed to be created is due to the core network apparatus or due to the base station, and wherein the transmitting the creation re-request comprises transmitting, at the user equipment, the creation re-request to the core network apparatus when the cause information indicates the core network apparatus, and transmitting, at the user equipment, the creation re-request to the base station when the cause information indicates the base station.

10. The communication control method according to claim 1, wherein the deciding the communication condition comprises deciding, at an application layer of the user equipment, the communication condition, and wherein the transmitting the creation request comprises transmitting, at a Non-Access Stratum (NAS) layer of the user equipment, the creation request comprising the communication condition provided from the application layer.

11. The communication control method according to claim 10, further comprising providing, at the NAS layer, the creation success notification to an Access Stratum (AS) layer of the user equipment.

12. The communication control method according to claim 10, further comprising providing, at the NAS layer, a creation failure notification to an AS layer of the user equipment.

13. A communication control method comprising:

receiving, at a core network apparatus, a creation request from a user equipment, the creation request requesting to create a network slice desired by the user equipment, wherein the creation request comprises information indicating a communication condition decided by the user equipment and to be satisfied by the network slice, wherein the network slice comprises a core network part created by the core network apparatus and a Radio Access Network (RAN) part created by a base station, and wherein the communication control method further comprises:

transmitting, at the core network apparatus, information required for creating the RAN part to the base station, based on the communication condition when the core network apparatus successfully creates the core network part, and transmitting, at the core network apparatus, a creation failure notification comprising information indicating that the network slice is failed to be created to the user equipment when the core network apparatus fails to create the core network part or receives information indicating that the RAN part is failed to be created from the base station.

14. The communication control method according to claim 13, further comprising transmitting, at the core network apparatus, a creation success notification to the user equipment when the core network apparatus receives information indicating that the RAN part is successfully created from the base station, the creation success notification comprising a slice identifier configured to identify the network slice created based on the communication condition.

15. A user equipment comprising:

a circuitry configured to decide a communication condition to be satisfied by a network slice desired by the user equipment, the network slice being created at a core network apparatus and a base station, a transceiver configured to transmit a creation request to a core network apparatus, the creation request being a message requesting to create the network slice and comprising information indicating the communication condition, and a receiver configured to receive a creation success notification from the core network apparatus after transmitting the creation request, the creation success notification comprising a slice identifier configured to identify the network slice created based on the communication condition, wherein the transceiver is further configured to transmit, when the creation success notification comprises information indicating that at least one condition of a plurality of the communication conditions for the network slice is not satisfied, an update request configured to update the network slice to the core network apparatus or the base station in such a manner that the at least one condition of the plurality of the communication conditions is satisfied.

* * * * *